United States Patent [19]

Floren et al.

[11] Patent Number: 4,842,246
[45] Date of Patent: Jun. 27, 1989

[54] VALVE SEAT CONFIGURATION
[75] Inventors: Carl E. Floren, Decatur; Timothy M. Logman, Monticello, both of Ill.
[73] Assignee: Mueller Co., Decatur, Ill.
[21] Appl. No.: 182,024
[22] Filed: Apr. 15, 1988
[51] Int. Cl.$^4$ ............................................. F16K 1/42
[52] U.S. Cl. ................................... 251/333; 251/357
[58] Field of Search ............................. 251/333, 357
[56] References Cited
U.S. PATENT DOCUMENTS
3,510,103  5/1970  Carsello ............................. 251/333
FOREIGN PATENT DOCUMENTS
1080350  4/1960  Fed. Rep. of Germany ...... 251/333

Primary Examiner—Arnold Rosenthal
Attorney, Agent, or Firm—Cushman, Darby & Cushman

[57] ABSTRACT

An improved compression type valve for a fire hydrant or the like includes an improved resilient valve member for sealingly engaging a seating ring in order to control the passage of fluid through the valve. The improved valve member is provided with a first bevel extending from a side surface thereof toward the top surface of the valve member, and with a second bevel which extends from the first bevel to the top surface. The second bevel prevents pressure which is applied to the valve element from causing the top surface of the valve element to deform around its circumference and break off, as was the case with prior art valve members of this type.

2 Claims, 3 Drawing Sheets

VALVE SEAT CONFIGURATION

BACKGROUND OF THE INVENTION

1. Field of the Invention

The present invention relates to the field of valve seats which are used to stem the flow of a fluid within a valve. More particularly, the present invention relates to an improved main valve seat for use in a fire hydrant having improved pressure loss characteristics at a given flow rate.

2. Description of the Prior Art

The typical valve seat configuration for a prior art fire hydrant is illustrated in FIG. 1. The hydrant 10 includes a vertical barrel 12 which extends upwardly from a connection with a contoured shoe 32, which is connected to a water supply pipe. A drain ring housing 20 is secured between the barrel 12 and the contoured shoe 32 by means of a bolt 26 and is sealed with respect to barrel 12 by a gasket 28. A bronze seat ring 22 is threadedly engaged to an interior portion of drain ring housing 20 through a threaded connection 24. The seat ring 22 has a beveled seating surface 23 defined in an interior portion thereof for sealing against a main valve element 36.

In such prior art valves, it was common to provide a first bevel 37 between the side surface 46 and top surface 44 of the main valve element 36. In operation, a valve stem 14 would be pulled up, causing a valve plate 34 to urge main valve element 36 toward seat ring 22, so that the first bevel 37 engaged the seating surface 23 of seat ring 22. However, when pressure was applied to the valve, it was common for plastic creep to occur, causing a bulge 38 to form in the recess defined between the seating surface 23 of seat ring 22 and valve plate 16. As a result, the material forming main valve element 36 would eventually become fatigued, causing the top surface of the valve element to deform and eventually break off. As a result, frequent maintenance of such devices was required.

It is clear that there exists a long and unfilled need in the prior art for a valve seat configuration which prevents pressure which is applied to the valve element from causing the top surface of the valve element to deform around its circumference and break off, as was the case with prior art valve members of this type.

ASSEMBLY OF THE INVENTION

It is thus an object of the present invention to provide a valve seat configuration which prevents pressure which is applied to the valve element from causing the top surface of the valve element to deform around its circumference and break off, as was the case with prior art valve numbers of this type.

A compression-type valve constructed according to the present invention for controlling the flow of fluid between a first and second space includes a seating ring, and a valve member for sealingly engaging the seating ring, which includes a resilient cylindrical body having a side surface, a top surface and a bottom surface, a first inward bevel being defined circumferentially from the side surface toward the top surface, and a second bevel defined circumferentially between the first bevel and the top surface, the second bevel being inclined at a greater angle with respect to the axis of the cylindrical body than the first bevel, whereby polymer creep and resultant fragmentation along the top surface of the valve element is prevented, and a linkage for moving the valve member relative to the seating ring.

Other objects, features, and characteristics of the present invention, as well as the methods and operation and functions of the related elements of the structure, and to the combination of parts and economies of manufacture, will become apparent upon consideration of the following description in the appended claims with reference to the accompanying drawings, all of which form a part of this specification, wherein like reference numerals designate corresponding parts in the various figures.

DETAILED DESCRIPTION OF THE PREFERRED EMBODIMENT

Figure 2:
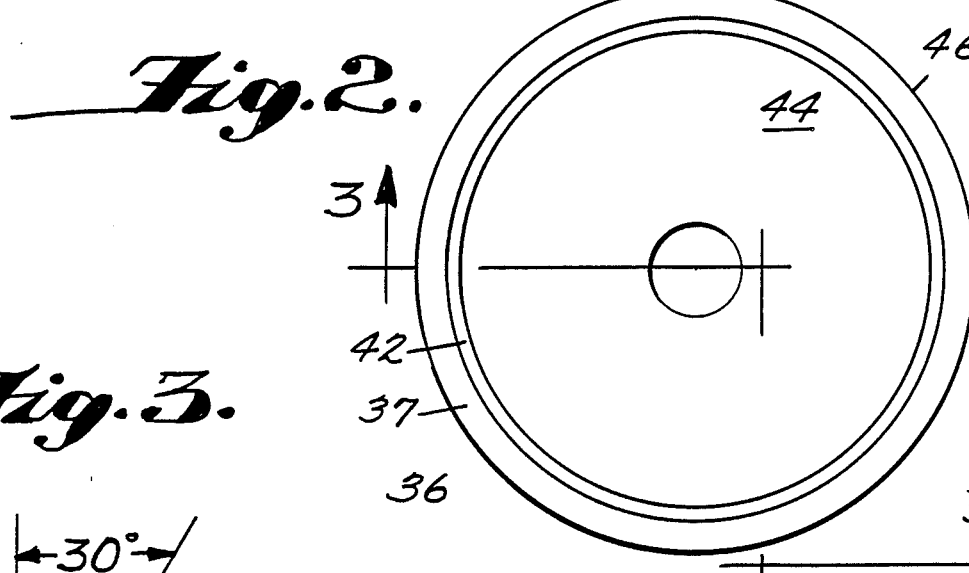
FIG. 2 is a cross-section top plan view of a main valve member constructed according to the present invention.

Referring to FIG. 2, a valve constructed according to the present invention utilizes a main valve member 36 having a top surface 44, a side surface 46, a first beveled portion 37 extending from side surface 46 toward top surface 44, and a second beveled surface 42 extending from the first beveled surface 37 to top surface 44.

Figure 4:
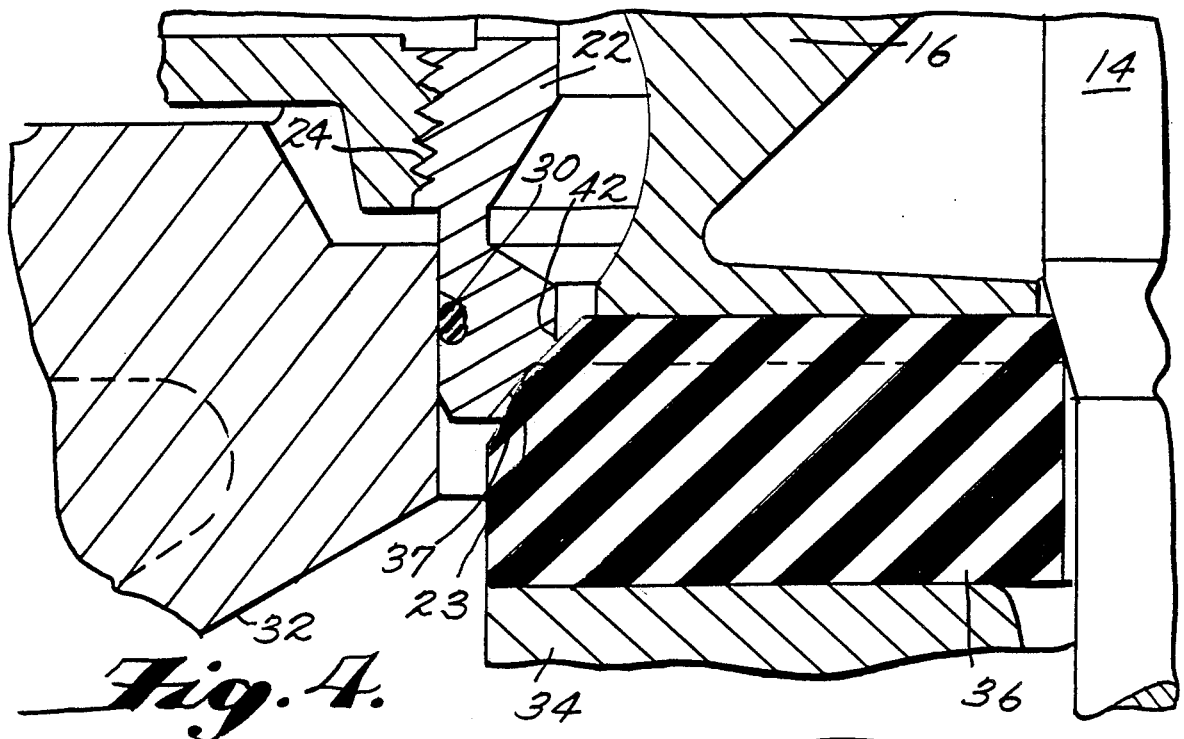
FIG. 4 is a cross-sectional view of the valve seat configuration of the present invention.

The valve configuration of the present invention is best illustrated in FIG. 4. Valve stem 14, valve plate 16, seat ring 22 and the threaded connection 24 are all conventional as illustrated in prior art FIG. 1. As in the prior art, an O-ring 30 is provided to ensure a sealing connection between seat ring 22 and the contoured shoe 32. As is shown in FIG. 4, the seating surface 23 of seat ring 22 engages main valve element 36 at a point intermediate the first and second bevel portions 37, 42. Thus, a greater amount of force per unit area is applied at the interface between seat ring 22 and main valve element 36 and was the case in prior art valves. As a result, sealing can be accomplished with less total force and less deformation of the main valve 36. In addition, what deformation does occur will tend not to cause plastic creep of the material forming the main valve 36 into the gap between valve plate 16 and seal ring 22, as was the case in prior art valve configurations, since second bevel 42 reduces the volume of the main valve element 36 which is immediately adjacent the gap. As a result, the portion of main value 36 adjacent the gap will not break off during repeated use, thus lengthening the life of the valve.

Figure 3:
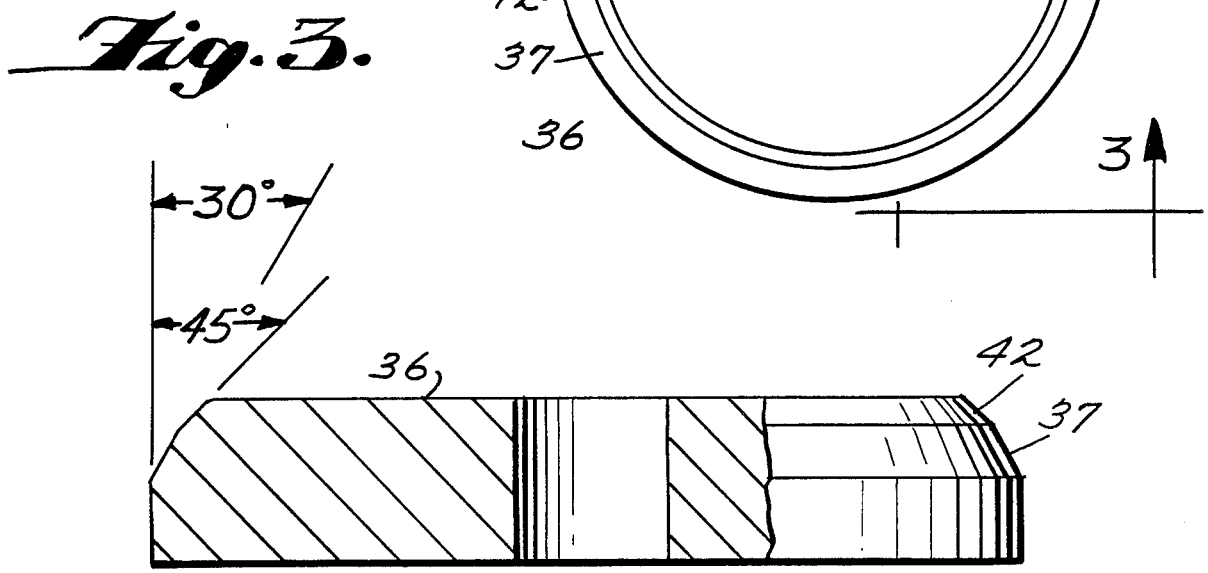
FIG. 3 is a view taken partially in cross-section along lines 3—3 in FIG. 2.

In the preferred embodiment, as is illustrated in FIG. 3, the first bevel is formed at an angle of 30° with respect to the axis of the cylindrical main valve element 36. The second bevel 42 is preferably formed at an angle of approximately 45° with respect to the axis of main valve element 36.

Figure 1:
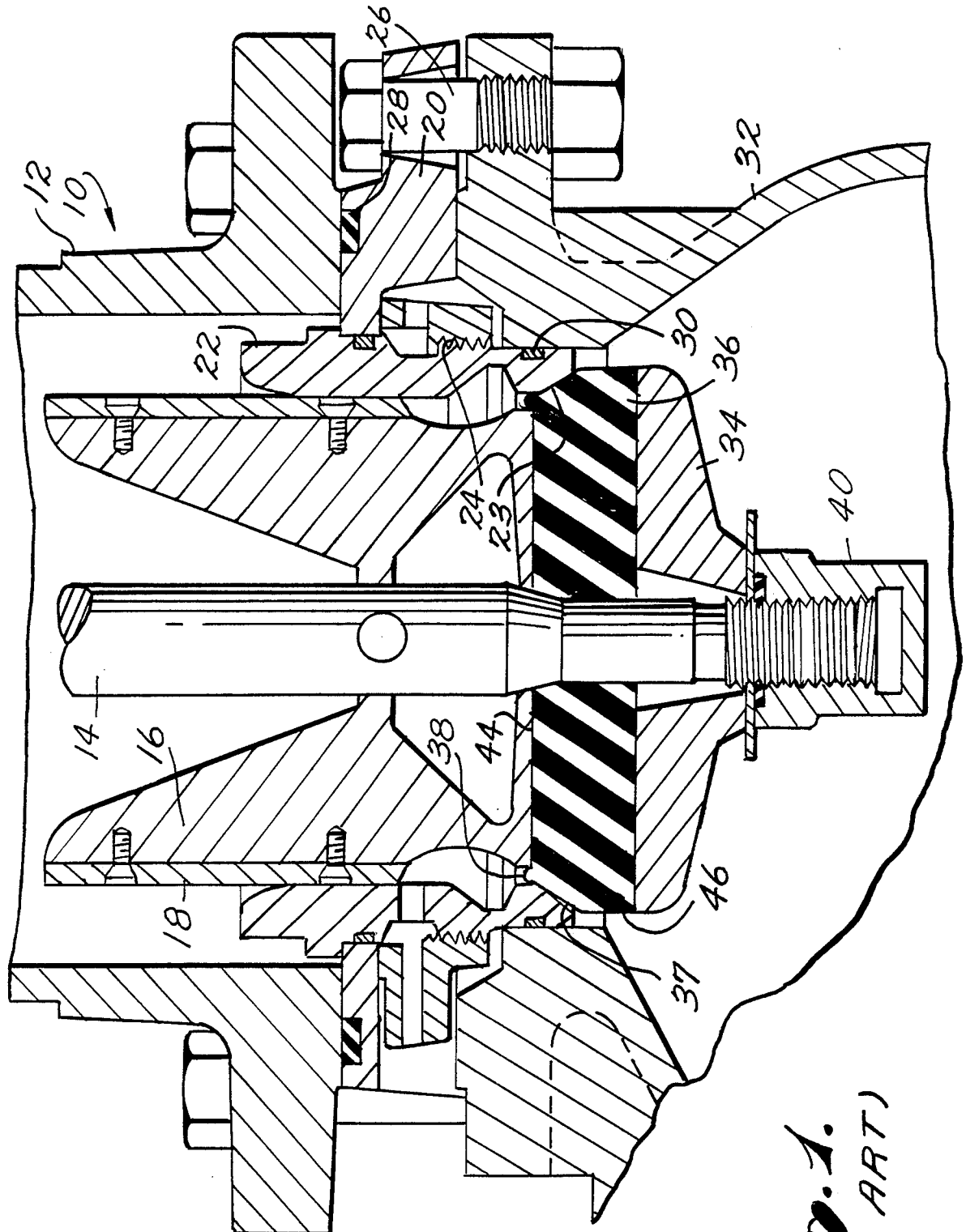
FIG. 1 is a cross-sectional view of a prior art compression-type valve configuration.
Figure 5:
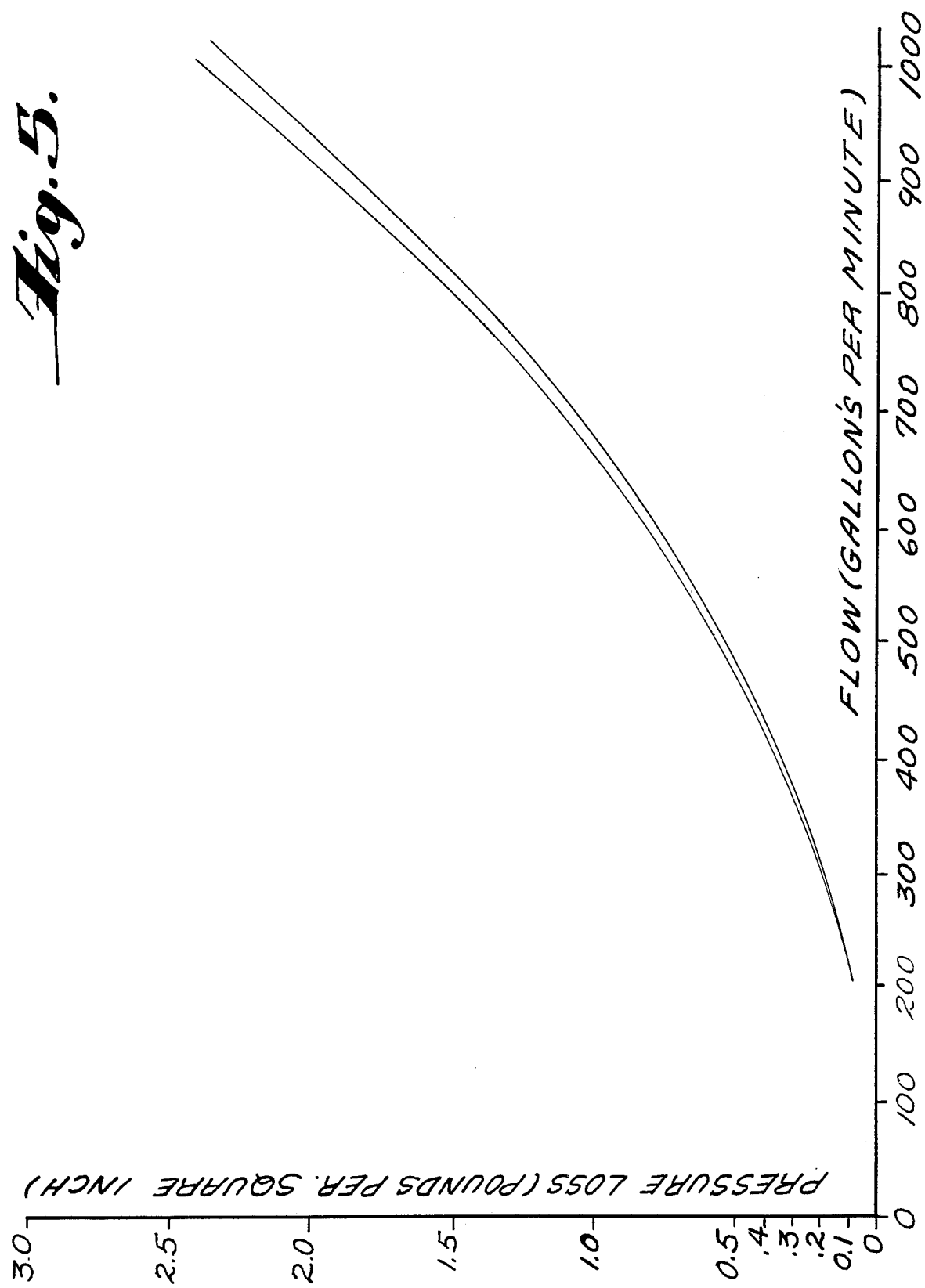
FIG. 5 is a graph illustrating the improved pressure loss characteristics of a valve constructed according to the present invention at a given flow rate.

The efficacy of a valve constructed according to the configuration illustrated in FIGS. 2-4 is depicted in FIG. 5 in contrast to the performance of a prior art valve such as that which is illustrated in FIG. 1. As is shown in FIG. 5, a valve constructed according to the present invention experiences less pressure loss at a given flow rate than a valve of the type which has been used in the past. It is felt that this increase in performance over the prior art is a result of both the inherent flow characteristics of the improved configuration of main valve seat 36 and the reduction in wear and deformation of the main valve member that is attributable thereto.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. A compression-type valve for a fire hydrant or the like, comprising:
    means defining a first space to which fluid may be supplied;
    means defining a second space to which the flow of fluid is to be controlled;
    seating ring means interposed between said means defining said first and second spaces;
    valve means for sealingly engaging said seating ring means including a resilient cylindrical body having a central axis and having a side surface, a top surface and a bottom surface, a first inward bevel being defined circumferentially from said side surface toward said top surface, and a second bevel defined circumferentially between said first bevel and said top surface, said second bevel being inclined at a greater angle with respect to the axis of said cylindrical body than said first bevel, whereby polymer creep and resultant fragmentation along the top surface of the valve element is prevented, said first bevel being inclined with respect to the axis of said cylindrical body at an angle of 30° and said second bevel being inclined with respect to the axis of said cylindrical body at an angle of 45°; and
    means for moving said valve means relative to said seating ring means.

2. Apparatus according to claim 1, wherein an axial bore is defined in said cylindrical body for accommodating said moving means.

* * * * *